Aug. 26, 1969 D. J. BERARD 3,462,961
SUBMARINE PIPELINE REPAIR CHAMBER AND METHOD
Filed July 5, 1967 3 Sheets-Sheet 2
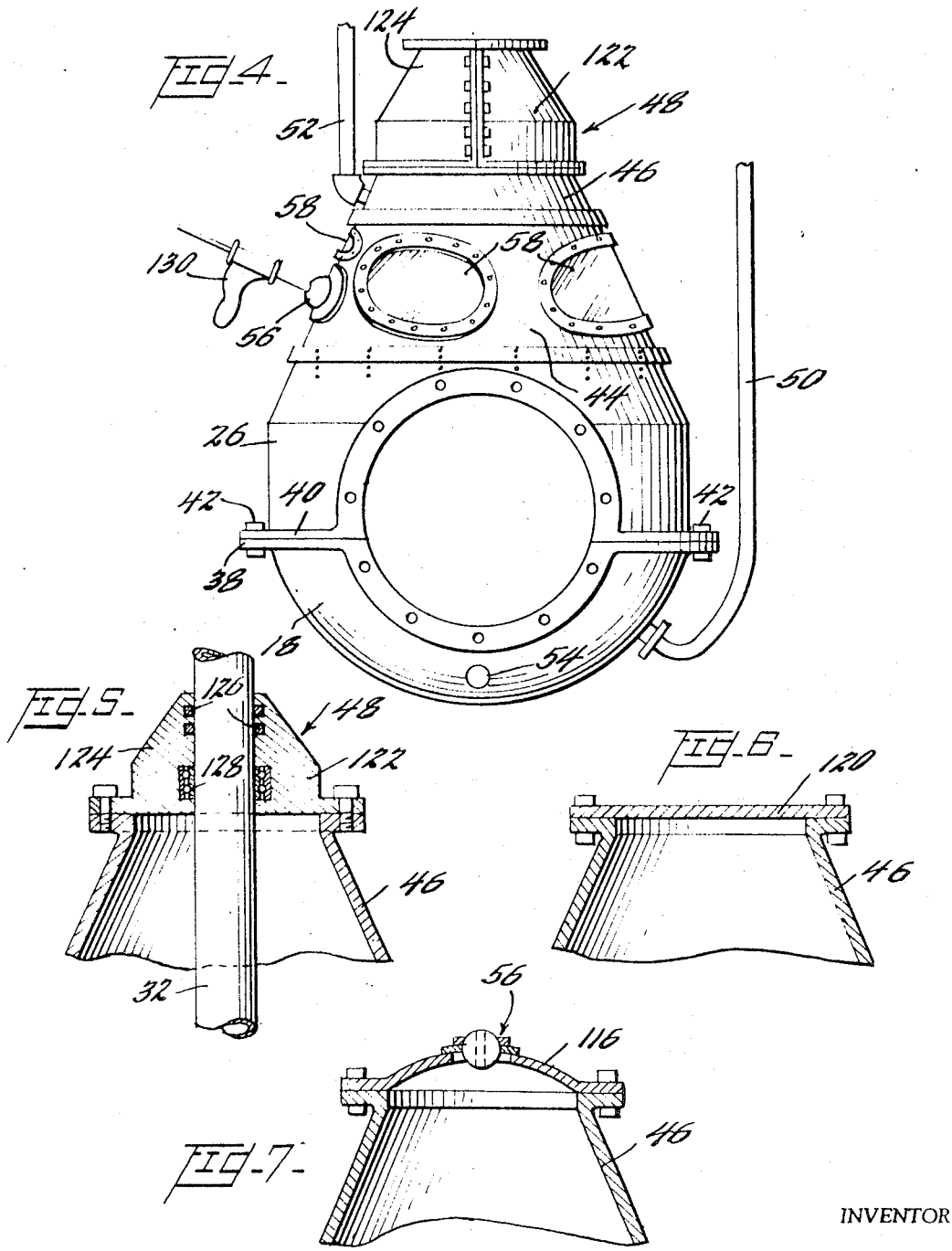
INVENTOR
Dailey J. Berard,
BY Misegades & Douglas
Keith Misegades ATTORNEYS

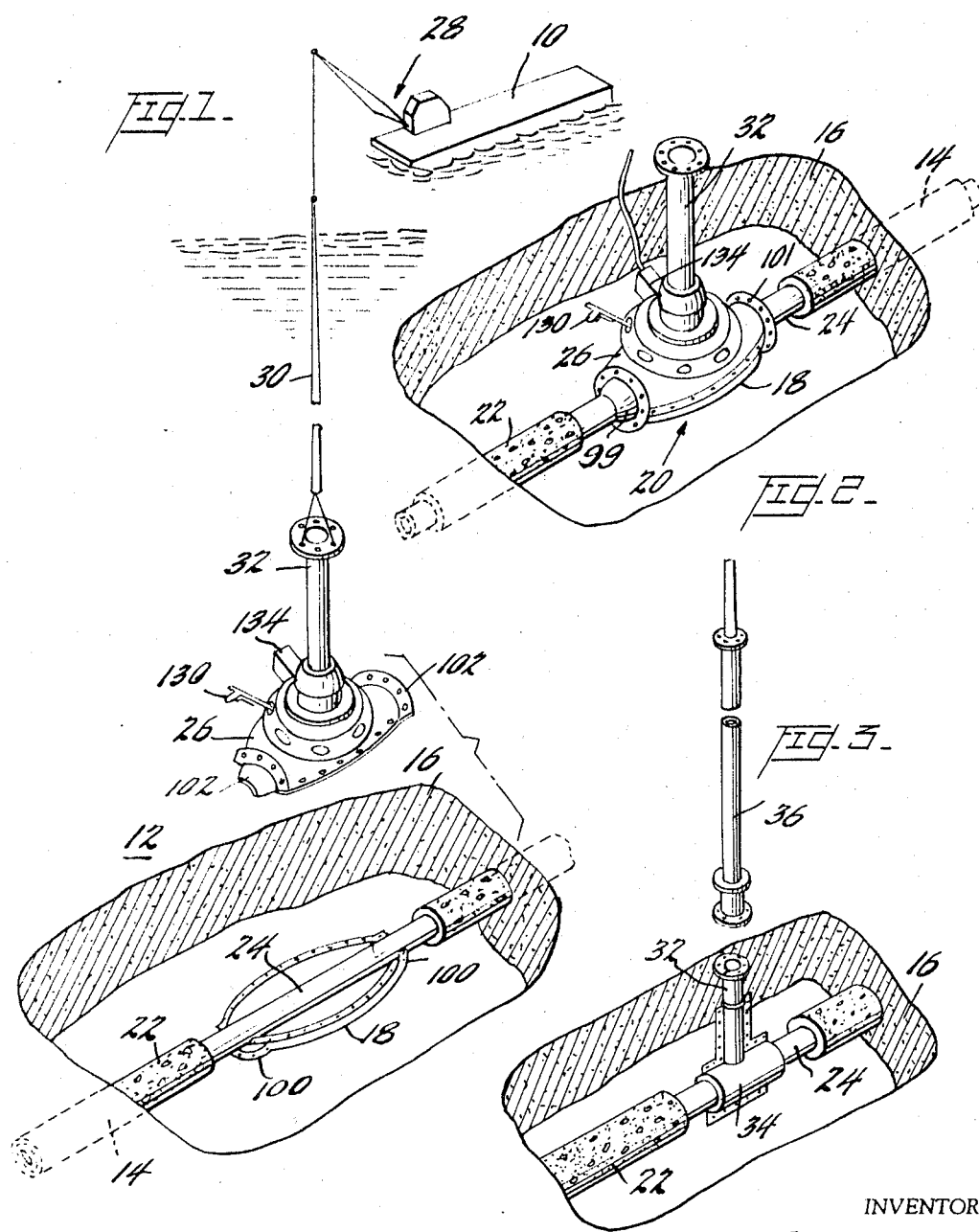

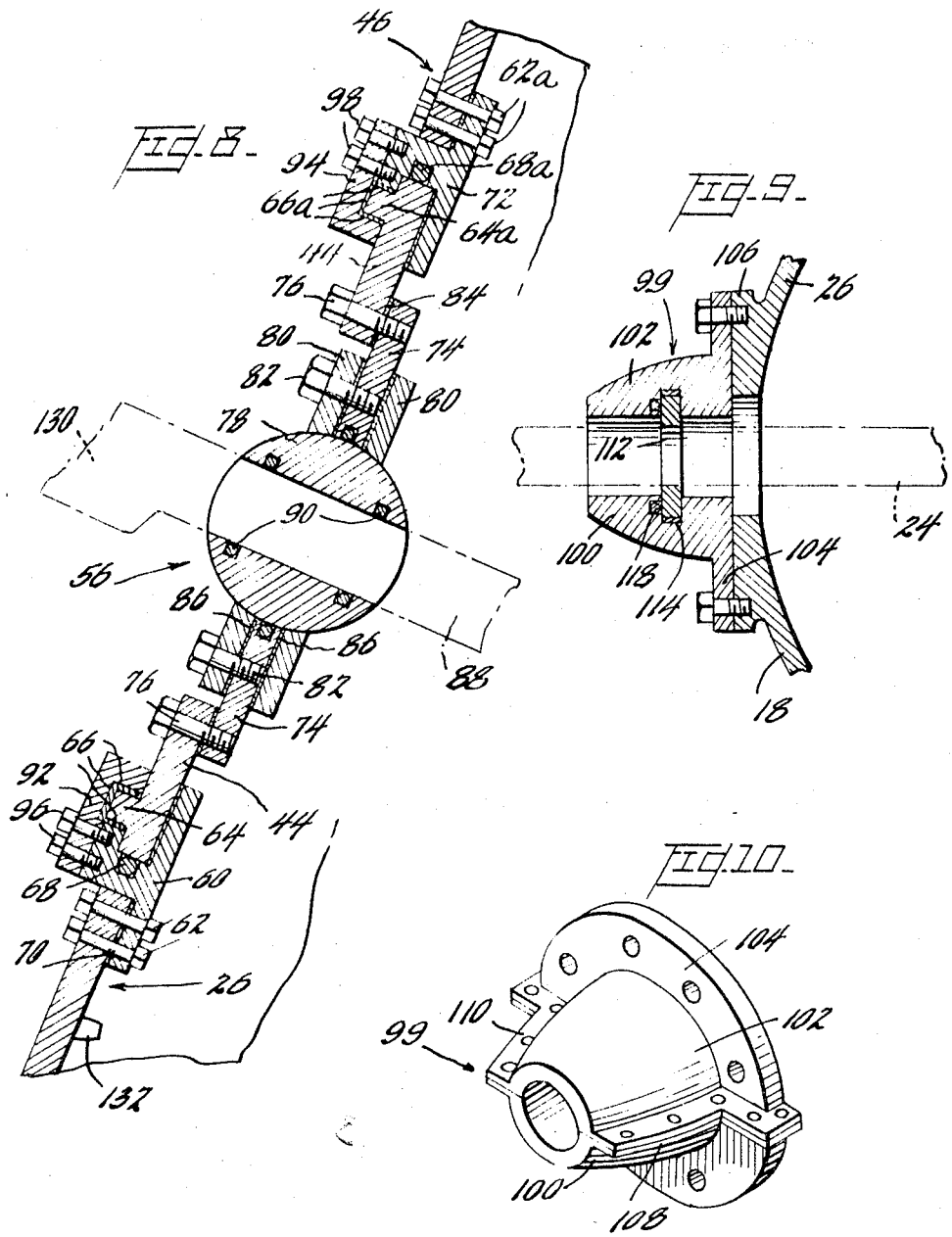

United States Patent Office

3,462,961
Patented Aug. 26, 1969

1

3,462,961
SUBMARINE PIPELINE REPAIR CHAMBER AND METHOD
Dailey J. Berard, New Orleans, La., assignor to Houston Contracting Company, Belle Chasse, La., a corporation of Louisiana
Filed July 5, 1967, Ser. No. 651,264
Int. Cl. B63b *35/04;* B63c *11/36;* F16l *1/00*
U.S. Cl. 61—69                                      17 Claims

ABSTRACT OF THE DISCLOSURE

The invention comprises a method and apparatus for the repair of submarine pipe lines and for the attachment of a riser pipe thereto. The method includes clamping a segmented chamber to an exposed pipeline portion, evacuating water from the chamber, and repairing the pipe or attaching a riser to the pipeline portion by means of tools operable from without the chamber, having operable members extending through a side wall, into the evacuated chamber. The apparatus includes a chamber of two generally semi-ellipsoidal casings, clamped about the pipeline portion, inlet and outlet means for air under pressure, a rotatable turret on the upper hemi-ellipsoidal casing, ports in the turret for admitting tools into the chamber, the tools being an electric air welder, or cutting torch, and a split flange on the top of the turret for receiving a riser pipe portion to be welded to the pipeline portion, which flange may be replaced by a tool mount blister for circumferential welding or cutting of the pipeline portion. Additionally, the casings are provided with packing means in their distal ends grasping the pipeline; bearings may be mounted about the packing means allowing free rotation of the chamber about the pipeline portion.

BACKGROUND OF THE INVENTION

The invention is directed to the problems involved in the repair of submerged pipe lines, and also presents a novel method and apparatus for attaching a riser pipe to any portion of such a submerged line. As a rule, such operations are now undertaken by use of a diving bell, adapted to fit around and engage a portion of the submerged pipe line. Additionally, a caisson tower may be provided for entry and egress by workmen, who conduct a repair or riser pipe attachment in the dry, artificial environment provided in the interior of such a bell.

Obviously, such equipment is expensive and cumbersome. Such a bell must be large enough to accommodate workmen and be weighted with a considerable amount of ballast to overcome negative buoyancy created by the large, air-filled interior of such a bell.

Since a majority of existing off-shore pipelines are in a maximum water depth of about seventy feet, well within the tolerable limits of diver operation, it is axiomatic that consderable expense and time in repairing submerged pipelines could be overcome if some means were provided allowing pipeline repair by a diver. The present invention provides such means.

Exemplary of the prior art devices are the U.S. Patents to Osborn, No. 2,667,751; Elliott, No. 2,812,641; and Law, No. 2,939,292. Osborn shows a diving bell having a slotted bottom for receiving a portion of the pipeline to be prepared. Elliott indicates a diving bell comprised of two mating shell members having complementary, sealed openings for receiving the pipeline to be prepared. Law shows yet another diving bell comprising two shell halves hingedly depending from a truncated cone caisson, provided with hydraulic arms for opening and closing the clamshell halves which grip the pipeline. Several tons of ballast are required for the device to overcome negative buoyancy.

2

Thus, the approach of prior art has been to provide an artificial atmosphere for submerged pipeline repair in the form of a diving bell, large enough to hold workmen. The approach of the instant invention is to provide an artificial atmosphere for submerged pipeline repair that is significantly smaller, comprising a relatively light weight chamber, easily placed by divers, having sealed ports admitting tools such as arc welders or torch cutters, operable by the diver exteriorally of the chamber.

SUMMARY

The gist of the invention is to provide a small, underwater chamber adapted to fit a submerged pipeline for repair thereof or attachment of a riser pipe thereto. The chamber comprises two hemiellipsoidal halves, having mating, semi-circular openings in their distal longitudinal ends adapted for sealing engagement with a portion of a submerged pipeline to be repaired. The upper half of the chamber includes a rotatable turret having viewports for observing the work done on the pipe. Two forms of caps may be used on the upper chamber portion; the first adapted to sealably grip a riser pipe portion, the second adapted to receive a tool such as an arc welder or torch cutter for work on the enclosed pipeline portion. Inlet and egress means are provided to dispose of water from the closed chamber. Packing means may be provided in the upper chamber riser pipe portion cap allowing free rotation of the riser pipe therein, and in semicircular openings of the hemiellipsoidal chamber halves allowing free rotation of the chamber about the pipeline. The method of the invention includes welding a pipeline portion, such as a riser pipe, to the enclosed submerged pipeline, removing the chamber, placing a split T fitting about the submerged pipeline and riser pipe portion to strengthen the connection, attaching successive riser pipe portions until the riser pipe extends above the surface of the water, and finally tapping the submerged pipeline from above the surface of the water through the completed riser pipe.

BRIEF DESCRIPTION OF THE DRAWINGS

Details of construction and operation according to preferred embodiments of the invention will become readily apparent by reference to the following drawings wherein:

FIGURE 1 is a diagrammatic view in perspective showing initial placement of the chamber halves about a submerged pipeline portion;

FIGURE 2 is another diagrammatic view in perspective, similar to FIGURE 1, showing the chamber secured to a pipeline in an operative position;

FIGURE 3 is yet another diagrammatic view in perspective, similar to FIGURES 1 and 2, showing the final stages of attaching a riser pipe to a pipeline portion according to the method of the invention;

FIGURE 4 is an elevational end view of the invention;

FIGURE 5 is a sectional view of one embodiment of the upper cap portion of the chamber, showing a riser pipe secured therein;

FIGURES 6 and 7 are sectional views similar to FIGURE 5, showing other embodiments of the cap portion of the chamber;

FIGURE 8 is a partial sectional view through the upper portion of the invention shown in FIGURE 4 showing the mounting of a tool through a side wall of the chamber;

FIGURE 9 is a sectional view of one of the two pipeline engaging end caps of the chamber; and FIGURE 10 is a view in perspective of the end cap shown in FIGURE 9.

DESCRIPTION OF THE PREFERRED EMBODIMENTS

Referring now to the drawings by reference character and in particular to FIGURES 1 through 3 thereof there is shown a barge 10 employed as a service craft for divers working on a sea floor 12 and within the scope of the present invention, on a submerged pipeline 14. Generally, such pipelines are embedded in sea floor 12. In order to effect a repair operation, or to attach a vertical riser pipe as illustrated in FIGS. 1 through 3, the overburden is removed leaving a pit 16 in sea floor 12 of a sufficient depth to accommodate lower casing 18 of the invention, a work chamber designated by numeral 20. Prior to the placement of casing 18, the protective coating 22 is removed, leaving an exposed metal pipeline portion 24. The jacket or coating 22 may be made of concrete.

Once lower casing 18 is in place, upper casing 26 is lowered by convenient means, such as a boom crane 28 situated on barge 10, and line 30, and is bolted onto lower casing 18 to substantially encompass pipeline portion 24. A riser pipe portion 32 is then welded onto pipe 24 in a manner hereinbelow set forth. Once riser 32 is in place, chamber 20 is removed, a split T-fitting 34 is bolted into place (FIG. 3) about the junction of pipe 24 and riser 32, a successive length or lengths of riser pipes 36 are connected to riser 32, until the riser pipe extends vertically above the water so that pipe 24 may then be tapped from the barge through riser sections 32 and 36 in any known manner of the art, the tapping operation per se being outside the scope of the instant invention. Completion of the riser attaching procedure includes applying a protective coating to exposed pipeline portion 24 and riser sections 32 and 36, and filling of pit 16 (not shown).

A specific description of the particular integral parts of chamber 20 comprising the apparatus of the invention follows with reference to the remaining figures of the drawings. As illustrated in FIGURE 4, chamber 20 includes lower casing 18 and upper casing 26, matably flanged at 38 and 40, respectively. Flanges 38 and 40 are provided with a plurality of bores for receiving bolts and nuts 42 serving to secure casings 18 and 26 to pipeline portion 24. Upper casing 26 includes a medial, freely-rotating tool support turret 44 and support ring 46 and cap 48. An air inlet line 50 is mounted through lower casing 18 and an air exhaust line 52 is mounted through support ring 46. Once casings 18 and 26 are bolted together, water is exhausted from chamber 20 by admitting air under pressure through line 50. A check valve 54 in casing 18 permits discharge of the water. During a welding or cutting operation, as explained below, air may be pumped through line 50 into chamber 20 and exhausted through line 52 to relieve welding smog.

Turret 44 is provided with one or more tool mounts 56 as well as a plurality of viewports 58. The specific construction of a tool mount 56 as well as the interfitting of turret 44 with casing 26 and support ring 46 is illustrated in cross-section in FIGURE 8. The upper truncated conical side of casing 26 is provided with a circumferential receiving channel member 60, bolted thereto as by bolts 62, channel 60 being slotted to receive turret 44 which includes an annular ridge 64 formed to fit receiving channel 60. A plurality of roller bearings 66 are inserted between the three mating faces of ridge 64 and channel 60 thereby permitting free rotation of turret 44 on casing 26. A water tight seal between turret 44 and channel 60 is assured by means of an O-ring seal 68, and between channel member 60 and casing 26 by means of a Neoprene seal 70. In like manner, the downwardly divergent terminal skirt portion of ring 46 is also provided with a receiving channel member 72 adapted to receive the upper frusto-conical edge of turret 44. Annular ridge 64a, bolts 62a, bearings 66a and O-ring 68a are similar in construction and function to the corresponding unlettered parts described above.

Tool support 56 mounted in turret 44 includes a generally circular support plate 74, bolted within a mating port formed in turret 44 at 76, and a ball and socket tool receiving fitting 78, maintained within plate 74 by lock rings 80, 80, to circumferentially bolted to plate 74 at 82. A water tight fit is assured by Neoprene seals 84 between plate 74, turret 44, and 86, 86, between rings 80, 80 and plate 74. The socket of fitting 78 is of a diameter adapted to receive a tool such as the barrel 88 of a welding gun, which is sealed therewith by the two O-ring seals 90, 90. Thus ball and socket fitting 78 together with O-ring seals 90, 90 permits universal manipulation and limited insertion and withdrawal of barrel 88 to effect a welding or repair operation. Bolts 76 permit easy removal of the entire tool and tool mount for replacement by a different tool and mount. Correspondingly, plate portions 92 and 94 of channel members 60 and 72 respectively are removably secured by bolts 96 and 98, respectively, so that the entire turret 44 may be replaced with a turret having a different arrangement of tool supports.

The chamber 20 is attached to pipeline portions of varying diameter by means of adapter fittings 99 and 101, each comprising semi-conical shell members 100, 102 as shown in FIGURES 9 and 10. Each shell member is flanged at 104 for bolt connection to flange 106 found on the open ends of casings 18 and 26. Additionally, shell member 100 is flanged at 108, and member 102 at 110, flanges 108 and 110 being matingly bored to receive lock bolts when casings 18 and 26, with shell members 100 and 102 respectively bolted thereto, are secured together about pipeline portion 24 (FIGS. 1 and 2). A split packing ring 112 assures a water tight seal between bolted shell members 100 and 102 and the interior of chamber 20.

In the event it is desirable to use the invention to cut and level pipeline 14 at portion 24, bearing means 114 may be provided between packing ring 112 and shell members 100 and 102 in order to allow free rotation of chamber 20 about pipeline portion 24. Cap 48 of upper casing 26 is replaced by a tool mount comprising a blister 116, bolted to support ring 46 having a central port receiving a tool mount 56, as illustrated in FIGURE 7, which receives the barrel of a cutting torch (not shown). A water tight seal between packing ring 112 and shell members 100 and 102 is assured by an O-ring seal 118 (FIG. 9). Blister 116 may also receive tools through mount 56 for repairing pipe flaws, pits, defective seams or joints, or other pipeline defects which may be encountered. Of course, when cap 48 is not needed, the opening therein may be covered by a blind plate 120 as indicated by FIGURE 6.

The internal structure of cap 48, which is employed in attaching a riser pipe to the main pipeline, is best illustrated by reference to FIGURES 4 and 5. As in the case of adapter sections 99 and 101, cap 48 comprises two shell sections 122 and 124, each provided with mating bored flanges for engagement with each other and a mating flange on ring support 46. Shells 122 and 124 are of solid internal construction and are provided with O-ring seals 126, 128, to prevent entry of water about riser pipe 32 into chamber 20, and bearings 128, to allow rotation of riser pipe 32 into proper position to be welded onto pipeline portion 24. Of course, sections 122 and 125 are removable to permit replacement by similar sections of varying internal diameter, dependent upon the external diameter of riser pipe 32, or by blister 116, as previously set forth.

The welding of riser 32 to pipeline portion 24 begins by placing casing 18 as shown in FIGURE 1 and by lowering casing 26 from barge 10 with riser 32 secured therein by cap 48. Barrel 88 of welding gun 130 (FIGS. 4, 8) is also inserted into tool mount 26 prior to lowering of casing 26 into position. Once casings 18 and 26 are bolted together and water is evacuated from chamber 20, as previously explained, the welding operation can begin.

Of course, the upper open end of riser 32 is provided with a suitable seal (not shown) prior to lowering from barge 10. The welding gun 130, which per se forms no part of the instant invention, is of the semi-automatic electric variety, having internal means feeding the usual welding rod to the cathode tip of barrel 88 (not shown). The anode is attached to the exposed pipeline portion 24 externally of chamber 20 (not shown). Welding gun 130 may also be fully automatic in operation, controlled through suitable wiring from barge 10 and merely observed by a diver. In this case, rotation of turret 44 during the welding operation would be controlled by a motor mounted internally of casing 26 (not shown) having a gear drive meshing with a row of teeth formed in the lower, inner skirt of turret 44, at 132 (FIG. 8). Again, details of construction of such a mechanism form no part of the instant invention. Once riser 32 is in place, chamber 20 is flooded, casings 18 and 26 are removed, T-fitting 34 is bolted into place, and riser sections 36 are attached as previously explained.

It is obvious that many modifications of this basic structure hereinfore set forth may be made without departing from the scope of the instant invention. For example, the relatively small size of the invention allows easier handling, in comparison with cumbersome prior art devices, while reducing the effects of negative buoyancy to a negligible minimum. Turret 44 may be provided with proper fittings to accommodate a closed circuit television camera 134. One or more of the viewports 58 may be provided with known means for attaching a diver's faceplate, for closer observation of a repair or welding operation. A significant advantage lies in the fact that riser pipe attachments service connections for complete underwater piping systems and attachment of service valves may all be made in the manner set forth above, without shutting down the pipeline, a hot tap of the pipeline being made from barge 10 through risers 36 and 32 after the welding of riser 32 has been completed. Finally, chamber 20 may be provided with internal lighting to further enhance viewing of a repair or welding operation. Therefore, I am not to be limited to the precise embodiments hereinbefore provided, except as may be deemed to be within the scope of the following claims:

I claim:

1. A submergible chamber for facilitating the repair of an underwater pipeline comprising a bottom casing member, a top casing member, means defining semicircular mating openings in each of said members, adapted to receive said pipeline, means engaging said members snugly about said pipeline, packing means in said openings sealing the interior of the chamber, means in the chamber admitting air under pressure to evacuate water from the chamber, and port means in one of said members admitting a tool and facilitating manipulation of the tool from outside the chamber to act on a pipeline portion interiorally of the chamber.

2. The chamber of claim 1 wherein said port means comprises a ball and socket fitting, swivably mounted in sealed relationship to the interior of the chamber through a wall of one of said members, said ball adapted to receive the tool there through, and packing means in the ball about the tool further sealing the interior of the chamber.

3. The device of claim 2 wherein the tool comprises a welding tool, the barrel thereof formed to be received in the ball and socket.

4. The chamber of claim 1 wherein said top casing member comprises a base portion, adapted to interfit with the pipeline and connect with the bottom casing member, a rotatable turret above said base portion, a support ring on the turret, freely rotatably mounted thereon, and a cap on the support ring sealing the chamber.

5. The device of claim 4 wherein said port means is defined in said turret.

6. The device of claim 5 wherein said port means comprises a generally circular plate formed in a side wall of the turret, a ball and socket fitting swivably mounted in sealed relationship with and centrally of the plate, said ball adapted to receive said tool, and packing means in the ball about the tool further sealing the interior of the chamber.

7. The device of claim 4 wherein said cap portion comprises a generally circular plate removably secured to the support ring, said port means defined centrally through the cap and comprising a ball and socket fitting swivably mounted centrally of the plate.

8. The device of claim 4 wherein said cap portion comprises a pair of semi-circular sealing clamp flanges on this support flange adapted to encircle a riser pipe, inserted therethorugh into the chamber.

9. The chamber of claim 1 wherein said means defining said semi-circular pipe-receiving openings each comprise a shell section, removably secured to said casing, having an internal diameter slightly greater than the external diameter of said pipeline, packing means located therein, and bearing means within said shell sections and packing means whereby said chamber is free to rotate about said pipeline.

10. In a submergible chamber that is clampingly engaged in a sealed relationship about a portion of an underwater pipeline, and having means for evacuating water from the chamber, sealed port means defined through a side wall of said chamber admitting a tool and facilitating manipulation of the tool from outside the chamber to act on a pipeline portion interiorly of the chamber, comprising a ball and socket fitting, swivably mounted through said wall of the chamber, said ball being formed to receive a tool therethrough.

11. The device of claim 10 wherein a view port is formed in said wall of the chamber for visual inspection of the operation of the tool therewithin.

12. The device of claim 10 wherein clamping flange means, adapted to receive a riser pipe for said pipeline, is provided on the upper portion of said chamber, said tool being a welding device for welding the riser pipe to the pipeline.

13. The device of claim 10 wherein mounting means for said port means is provided in the wall of said chamber comprising a blister, receiving said ball and socket, removably bolted in sealed relationship through said wall of said chamber.

14. In a submergible chamber that is clampingly engaged in a sealed relationship about a portion of an underwater pipeline, and having means for evacuating water from the chamber, a turret formed in a wall of the chamber, freely rotatable about an axis substantially perpendicular to the axis of the pipeline, said turret having port means defined therein admitting a tool interiorally of the chamber for acting on the pipeline.

15. The device of claim 14 wherein a viewport is provided in the turret for visual observation of the tool operation internally of the chamber.

16. The device of claim 14 wherein said port means defined in the turret comprise a blister, removably bolted in sealed relationship through a side wall of the turret and a ball and socket fitting, swivably mounted substantially centrally of the blister, said ball adapted to receive said tool.

17. A method of attaching a riser pipe to a submerged underwater pipeline comprising removal of any protective coating of said pipeline in the vicinity of that portion of the pipeline to which the riser pipe is to be attached, placement of a first partial ellipsoidal casing about the lower portion of said pipeline portion, placement of a second partial ellipsoidal casing over the upper portion of said pipeline, said second casing having port means therein admitting the barrel of a welding tool, viewport means for observing the operation of the tool, and clamp flange means in the upper portion thereof arranged to receive a riser pipe portion through said upper portion of the second casing, clamping said casings together in sealed relationship about said pipeline portion, removing water from the closed casing, welding the lower terminal portion of the riser pipe to the pipeline portion, removing said first and second casings from the pipeline portion, attaching a split-T flanged jacket about said pipeline and riser pipe portions, connecting successive riser pipe portions vertically and tapping said pipeline portion internally of said riser pipe porton through said completed riser pipe.

References Cited

UNITED STATES PATENTS

| | | | |
|---|---|---|---|
| 935,485 | 9/1909 | Galoffre | 61—69 |
| 975,727 | 11/1910 | Smith | 61—69 |
| 2,812,641 | 11/1957 | Elliott | 61—81 |
| 2,939,292 | 6/1960 | Law | 61—63 |
| 3,328,970 | 7/1967 | Giambelluca | 61—69 |

JACOB SHAPIRO, Primary Examiner

U.S. Cl. X.R.

61—68, 72.1, 72.3